United States Patent
Yan et al.

(10) Patent No.: US 12,284,537 B2
(45) Date of Patent: Apr. 22, 2025

(54) METHOD AND SYSTEM FOR EVENT REPORTING TO THIRD PARTY DEVICES

(71) Applicant: Verizon Patent and Licensing Inc., Basking Ridge, NJ (US)

(72) Inventors: Lixia Yan, Basking Ridge, NJ (US); Ye Huang, San Ramon, CA (US); Violeta Cakulev, Millburn, NJ (US); Ali Imdad Malik, East Brunswick, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 412 days.

(21) Appl. No.: 17/835,007

(22) Filed: Jun. 8, 2022

(65) Prior Publication Data
US 2023/0403583 A1    Dec. 14, 2023

(51) Int. Cl.
*H04W 24/08*    (2009.01)
*H04W 76/20*    (2018.01)

(52) U.S. Cl.
CPC .......... *H04W 24/08* (2013.01); *H04W 76/20* (2018.02)

(58) Field of Classification Search
CPC .............................. H04W 24/08; H04W 76/20
See application file for complete search history.

(56) References Cited

U.S. PATENT DOCUMENTS

| | | | | |
|---|---|---|---|---|
| 2021/0064431 A1* | 3/2021 | Smith | ................... | G06F 9/5077 |
| 2022/0360608 A1* | 11/2022 | Raleigh | ................... | H04L 12/14 |
| 2023/0177941 A1* | 6/2023 | Roberts | ................ | G08B 21/182 |
| | | | | 340/539.11 |

* cited by examiner

Primary Examiner — Timothy X Pham

(57) ABSTRACT

A method, a network device, and a non-transitory computer-readable storage medium are described in relation to an event reporting service. The event reporting service may enable network devices, such as an application function, to subscribe to usage reporting in which notifications for a usage event may be reported periodically or non-singularly. The event reporting service may include data instances in messages exchanged between core network devices that configures the usage and event notification.

20 Claims, 7 Drawing Sheets

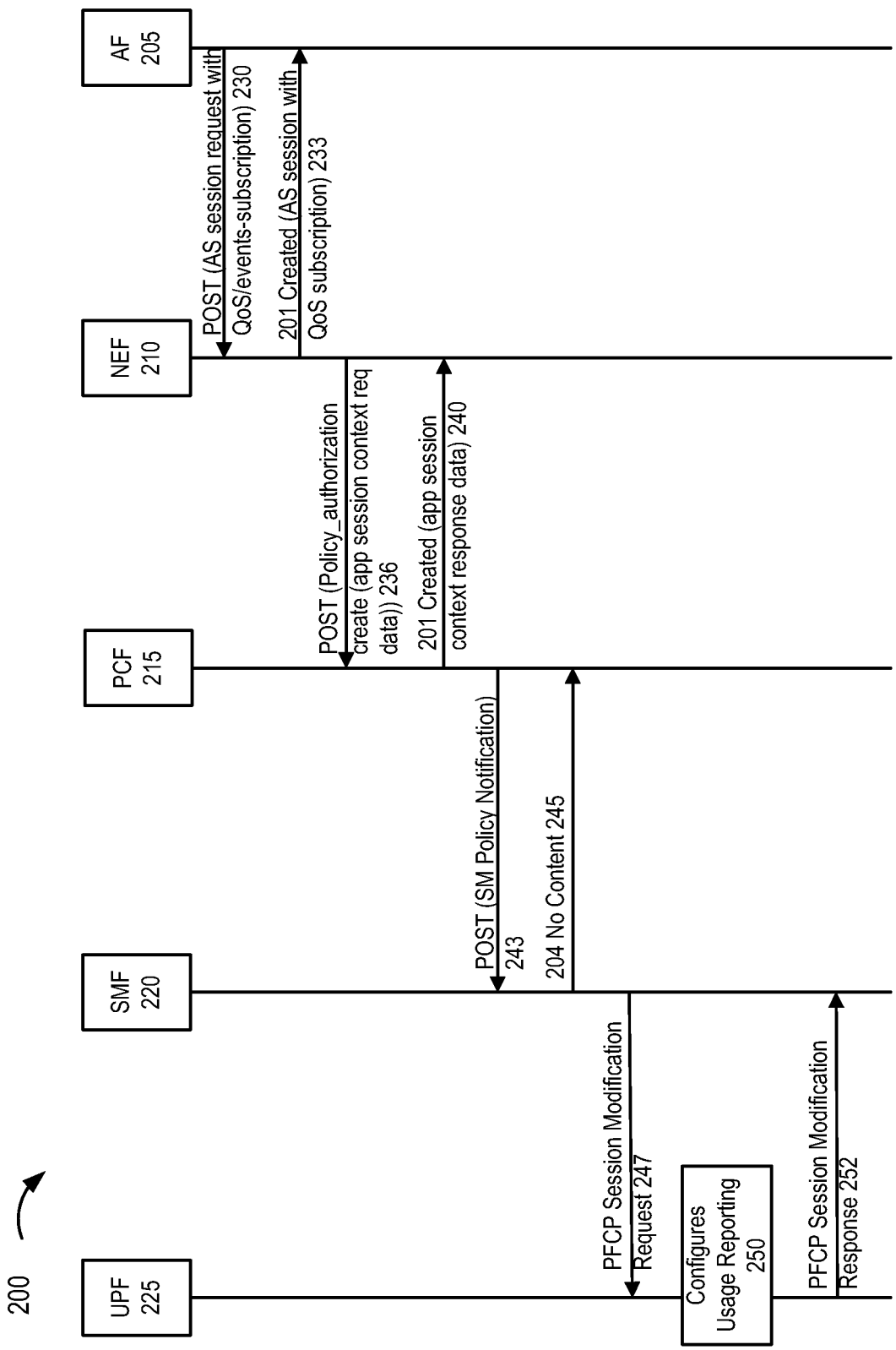

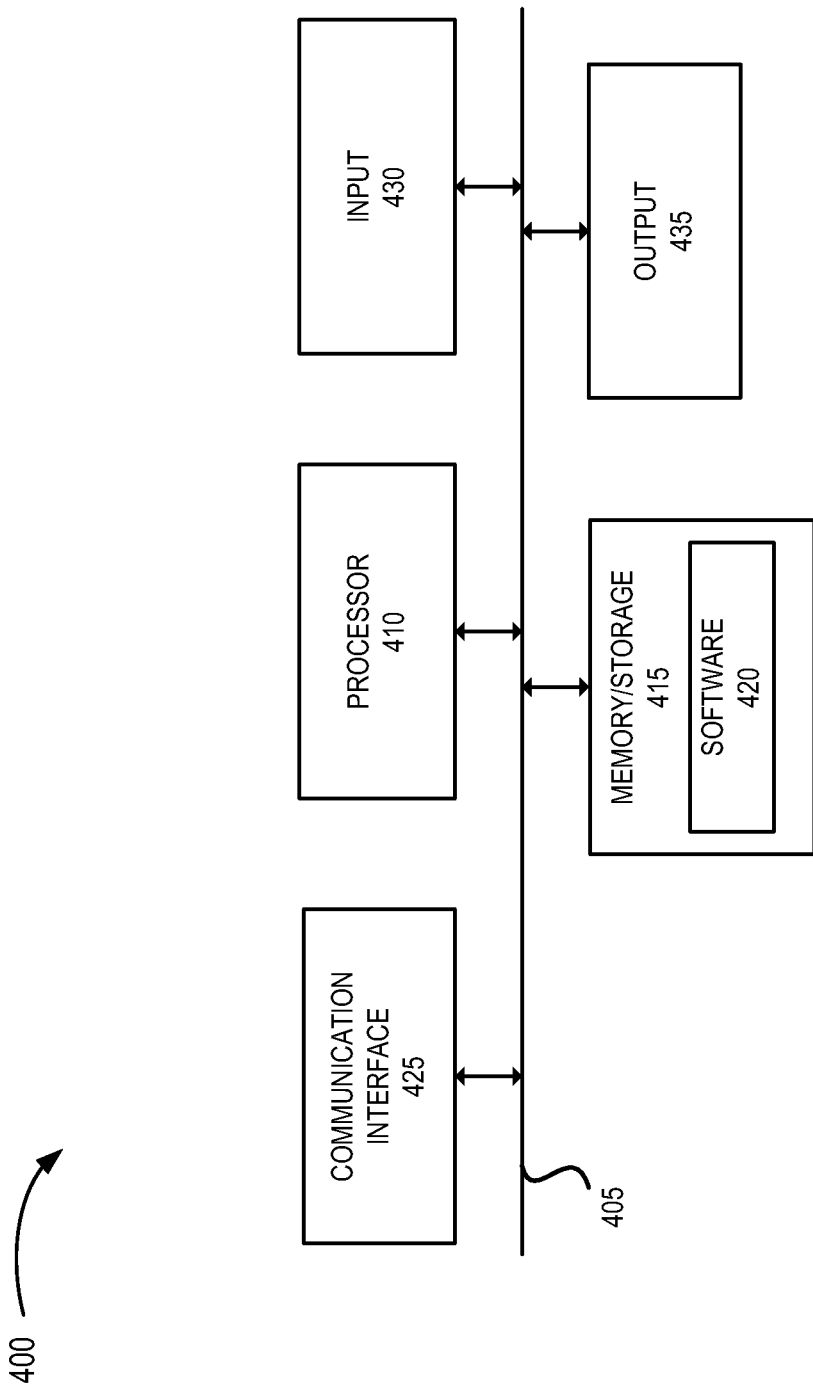

METHOD AND SYSTEM FOR EVENT REPORTING TO THIRD PARTY DEVICES

BACKGROUND

Development and design of networks present certain challenges from a network-side perspective and an end device perspective. For example, Next Generation (NG) wireless networks, such as Fifth Generation New Radio (5G NR) networks are being deployed and under development.

BRIEF DESCRIPTION OF THE DRAWINGS

FIGS. 2A and 2B are diagrams illustrating an exemplary process of an exemplary embodiment of the event reporting service;

FIG. 4 is a diagram illustrating exemplary components of a device that may correspond to one or more of the devices illustrated and described herein.

DETAILED DESCRIPTION

Figure 1:
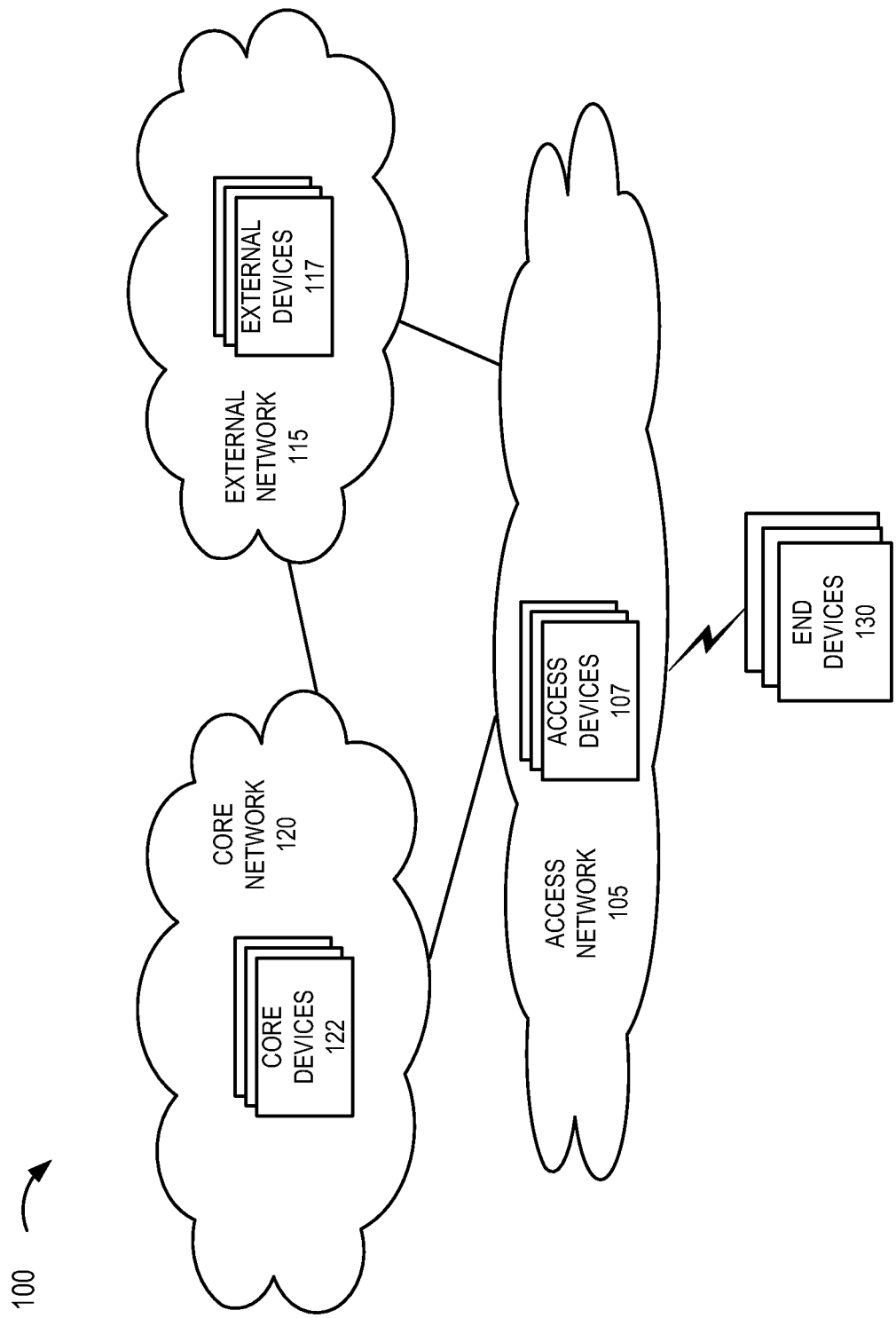
FIG. 1 is a diagram illustrating an exemplary environment in which an exemplary embodiment of an event reporting service may be implemented.

The following detailed description refers to the accompanying drawings. The same reference numbers in different drawings may identify the same or similar elements. Also, the following detailed description does not limit the invention.

Third party network devices may subscribe to and receive a notification from a Fifth Generation (5G) core network regarding a core network event. For example, the event may relate to a radio access type change, a public land mobile network (PLMN) change, a usage report, or an access network information report. However, currently, the 5G core network is allowed to provide a usage event to third party network devices a single time. For example, a third party application server may subscribe and receive a one-time notification when a subscriber may use a certain amount of data. As such, the subscription and notification mechanisms are quite limited. For example, the subscription and notification mechanisms do not support a more than one-time reporting, such as periodic or non-singular reporting, which may or may not be associated with one or multiple triggering events or criteria.

According to exemplary embodiments, an event reporting service is described. According to an exemplary embodiment, the event reporting service may support periodic or non-singular usage reporting to third party devices or other types of network devices that may subscribe to the event reporting service, as described herein. For example, the event reporting service may enable a network device to receive a usage report relating to a data volume-based event, a time-based event (e.g., a time period), or a combination of time and data volume-based events. By way of further example, the event reporting service may provide a third party application function (AF) a notification every time X amount of data is consumed by an end device/user associated with an application service, provide the third party AF a notification every X minutes while the end device/user uses the application service, or provide the third party AF a notification every X minutes and include the amount of data consumed during each X minutes.

According to an exemplary embodiment, the event reporting service may include data and/or information that enables a network device to request a subscription for usage reporting of the event reporting service, as described herein. According to an exemplary embodiment, the event reporting service may include interfaces that support the communication of such messages, as described herein. According to an exemplary embodiment, a core network device may include logic that detects and provides notifications to a subscribed network device in accordance with a usage event of the event reporting service, as described herein.

In view of the foregoing, the event reporting service may provide periodic or non-singular usage reporting associated with core network events. The event reporting service may enable reactionary network services to be provided based on the event reporting service. For example, third party application services may use the event reporting service to provide further end user services.

FIG. 1 is a diagram illustrating an exemplary environment 100 in which an exemplary embodiment of event reporting service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the event reporting service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), and the like) or a new interface of the network device may be provided in order to support the communication (e.g., transmission and reception of messages, an information element (IE), an attribute value pair (AVP), an object, a header, a parameter, or another form of a data instance) between network devices and the event reporting service logic of the network device. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Depending on the implementation, access network 105 may include one or multiple types of network devices, such as access devices 107. For example, access device 107 may include a next generation Node B (gNB), an evolved Long Term Evolution (eLTE) evolved Node B (eNB), an eNB, a radio network controller (RNC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), network function virtualization infrastructure (NFVI), and/or other types of virtualization elements, layers, hardware resources, operating systems, engines, etc.) that may be associated with application services for use by end devices (not illustrated). By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

End device 130 includes a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of UE). End device 130 may be configured to execute various types of software (e.g., applications, programs, etc.). The number and the types of software may vary among end devices 130. End devices 130 may include "edge-aware" and/or "edge-unaware" application service clients. For purposes of description, end device 130 is not considered a network device.

Figure 2B:
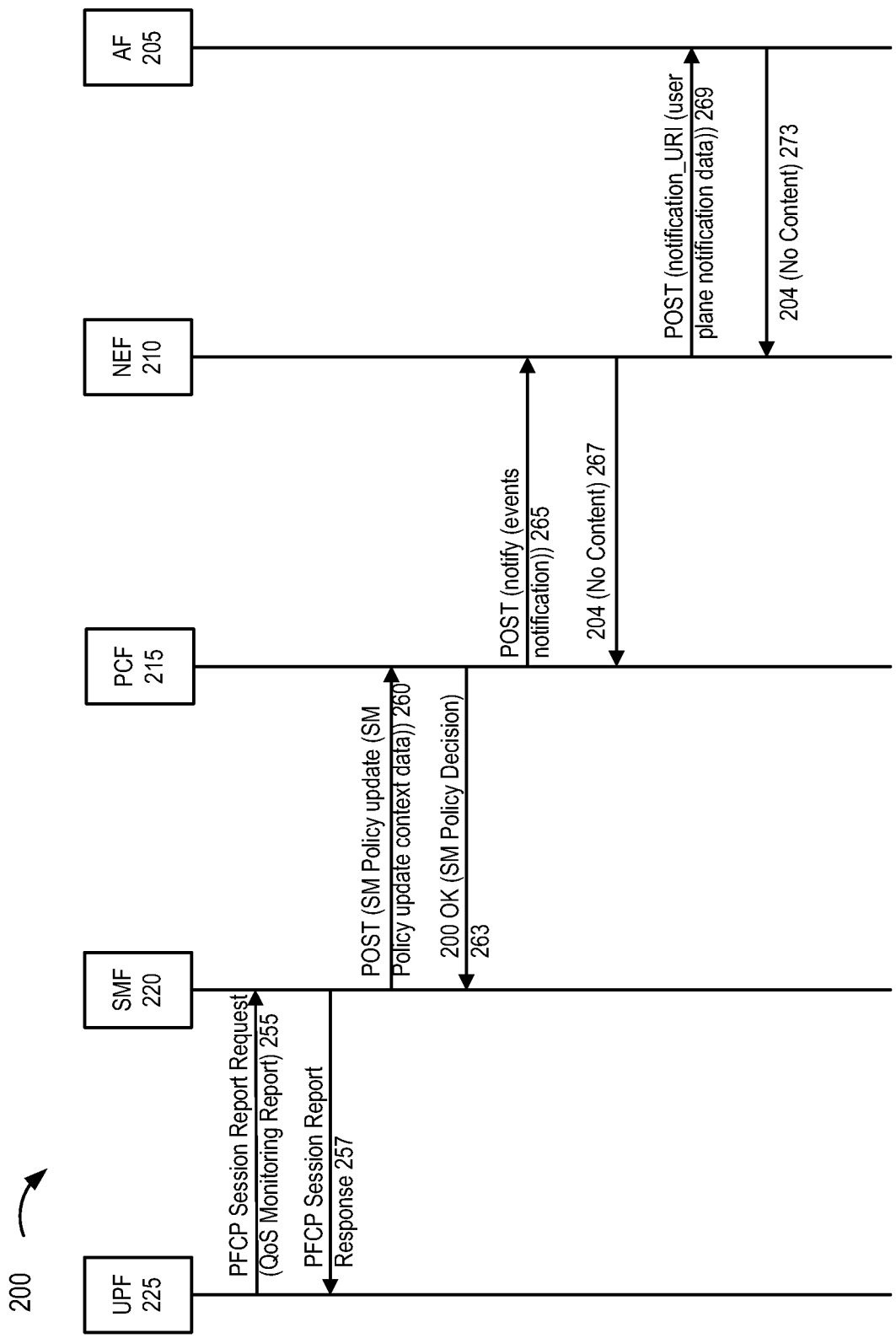

FIGS. 2A and 2B are diagrams illustrating an exemplary process 200 of an exemplary embodiment of the event reporting service according to an exemplary scenario. As illustrated, process 200 may implemented in an environment that includes core devices 122, such as a NEF 210, a PCF 215, an SMF 220, and a UPF 225. As described in relation to FIG. 1, according to other exemplary embodiments, the environment may include other types of core devices 122, not specifically illustrated and described in FIGS. 2A and 2B. As further illustrated, process 200 may be implemented in an environment that includes external device 117, such as an AF 205.

NEF 210, PCF 215, SMF 220, and UPF 225 may each provide a function and/or a service in accordance with a network standard (e.g., 3GPP, 3GPP2, ITU, ETSI, GSMA, and/or the like) and/or of a proprietary nature. For example, NEF 210 may provide secure exposure to services, capabilities, and resources over APIs within and outside of core network 120, perform packet filter description (PFD) management procedures, allow third party network devices to access core network devices, among other functions. PCF 215 may provide policies/rules to control plane network devices, make policy decisions based on subscription information, among other functions. SMF 220 may provide session management, Internet Protocol (IP) address allocation and management, selection, and control of user plane (UP) function, configuration of traffic steering, control of policy enforcement and quality of service (QoS), among other functions. UPF 225 may provide an external PDU session point of interconnect to external network 115 (e.g., a data network, etc.), provide packet routing and forwarding, packet inspection, user plane policy rule enforcement, traffic usage reporting, QoS handling for user plane, among other functions.

Additionally, for example, NEF 210, PCF 215, SMF 220, and/or UPF 225 may include logic of an exemplary embodiment of the event reporting service, as described herein. AF 205 may provide an end device application service. AF 205 may be implemented as a third party network device, for example, such as an application server. AF 205 may include logic of an exemplary embodiment of the event reporting service, as described herein.

The messages illustrated and described are exemplary. According to an exemplary embodiment, the messages may be implemented to include Hypertext Transfer Protocol (HTTP) messages. According to other exemplary embodiments, the messages may be implemented using a protocol different from HTTP. Additionally, process 200 may include additional messages and/or communications between core devices 122 not specifically described and illustrated.

Referring to FIG. 2A, according to an exemplary scenario, AF 205 may transmit a message to create a subscription to a usage event of the event reporting service. The usage event may pertain to an existing AF application session with end device 130 (not illustrated). For example, AF 205 may generate and transmit an HTTP POST message 230 to NEF 210. HTTP POST message 230 may include an application server (AS) session request with QoS information to be monitored. For example, the QoS information may indicate QoS monitoring information, such as uplink (UL)

packet delay, downlink (DL) packet delay, and/or roundtrip packet delay. HTTP POST message 230 may include other information, such as an identifier of AF 205, an IP address for end device 130, network slice information (e.g., single network slice selection assistance information (S-NSSAI)), and/or a flow identifier.

HTTP POST message 230 may include event subscription information. According to various exemplary embodiments, the event subscription information may include an information element or another form of a data instance of the event reporting service. For example, the information element may indicate that the notifications are to be periodic or non-singular. By way of further example, a notification information element may allow the provisioning of one of the following values, such as event detection, one-time, or periodic. Also, an information element may indicate a time interval between successive event notifications when the notifications are to be periodic. For example, the time interval may be expressed in seconds, minutes, or another suitable unit of measure of time. By way of further example, a repetition information element may indicate the time interval between successive notifications when the notification element is included and has a periodic value.

The event subscription information may include other usage event threshold data, such as information elements pertaining to a total volume of data for uplink and downlink (e.g., total data octets or another type of unit of measure for data volume) an uplink volume, a downlink volume, a duration, and/or another type of usage threshold value in which the QoS is to be applied.

In response to receiving HTTP POST message 230, assume NEF 210 accepts the subscription request and generates and transmits an HTTP 201 Created message 233 to AF 205. HTTP 201 Created message 233 may include the location or URI of the newly created resource. As further illustrated, NEF 210 may generate and transmit an HTTP POST message 236 to PCF 215. HTTP POST message 236 may include a policy authorization create message that may create an application session context in PCF 215. For example, the application session context request data may include an identifier of AF 205, an IP address for end device 130, an identifier of end device 130 (e.g., a Subscription Permanent Identifier (SUPI), a Generic Public Subscription Identifier (GPSI), or the like), and event subscription information with usage event threshold data, as described herein. In response, PCF 215 may generate and transmit an HTTP 201 Created message 240 to NEF 210. HTTP 201 Created message 240 may indicate the successful creation of the App session context resource. HTTP 201 Created message 240 may include other data instances, such as authorization data of the App session context and an identifier of end device 130.

In response, PCF 215 may generate and transmit an HTTP POST message 243 to SMF 220. HTTP POST message 243 may include an SM Policy association update request to provision policies related to an SM policy resource. HTTP POST message 243 may include an updated SM policy and the resource URI of the SM policy. HTTP POST message 243 may further include usage monitoring information. For example, the usage monitoring information may set the time and/or volume thresholds to be monitored, and the notification to be periodic or non-singular, for example. In response to receiving HTTP POST message 243 and successfully updating the SM policy, SMF 220 may generate and transmit an HTTP 204 No Content message 245 to PCF 215.

Based on the transmission of HTTP 204 message 245, SMF 220 may initiate a Packet Forwarding Control Protocol (PFCP) Session Modification procedure. For example, SMF 220 may generate and transmit a PFCP Session Modification Request 247 to UPF 225. For example, PFCP Session Modification Request 247 may include a create or update a usage reporting rule (URR) information element that may be associated with a packet detection rule (PDR) and may include triggers and thresholds for usage reporting.

As illustrated, in response to receiving PCFP Session Modification Request 247, UPF 225 may configure 250 usage reporting for a PDU session (e.g., an existing PDU session). For example, UPF 225 may identify a PFCP session context associated with the PDU session, and may update the parameters of the session context according to the usage reporting/event subscription information, as described herein. UPF 225 may generate and transmit a PFCP Session Modification response 252 to SMF 220. PFCP Session Modification response 252 may include information that indicates the information that UPF 225 is to provide to SMF 220 based on the usage reporting rule/event subscription information (e.g., time and/or volume, periodic or non-singular).

Referring to FIG. 2B, UPF 225 may notify SMF 220 when the time and/or volume of thresholds are satisfied based on the URR information. For example, UPF 225 may generate and transmit a PFCP Session Report Request 255 to SMF 220. PFCP Session Report Request 255 may include the usage report and usage details relating to time and/or volume of data, as described herein. UPF 225 may reset its local counter, timer, or similar type of mechanism to enable subsequent usage reporting. SMF 220 may receive PFCP Session Report Request 255, and in response, may generate and transmit a PFCP Session Report Response 257, which may indicate the success of the failure of the received message.

Thereafter, SMF 220 may generate and transmit an HTTP POST message 260 to PCF 215. HTTP POST message 260 may include an SM policy identifier, a URI identifier of the resource, and SM Policy Update Context data, for example. The SM Policy Update Context data may include the time and/or data volume values associated with the usage monitoring. Based on a successful update, PCF 215 may generate and transmit an HTTP 200 OK message 263 to SMF 220. HTTP 200 OK message 262 may include a representation of the updated policies.

As further illustrated in FIG. 2B, PCF 215 may notify an NF service consumer when a subscribed application session context event occurs. For example, as a part of a policy authorization notification procedure, PCF 215 may generate and transmit an HTTP POST message 265 to NEF 210. HTTP POST message 265 may include the notification URI and append the "notify" segment path at the end of the URI. HTTP POST message 265 may include the usage event information and an event subscription resource identifier. NEF 210 may generate and transmit an HTTP 204 No Content message 267 to indicate acceptance of HTTP POST message 265.

Based on receiving HTTP POST message 265, NEF 210 may generate an HTTP POST message 269 to AF 205. For example, HTTP POST message 269 may include the user plane event notification data pertaining to the subscribed event. AF 205 may generate and transmit an HTTP 204 No Content message 273 to indicate acceptance of HTTP POST message 269. According to other exemplary embodiments and scenarios, process 200 may include additional operations, fewer operations, and/or different operations.

Figure 3A:
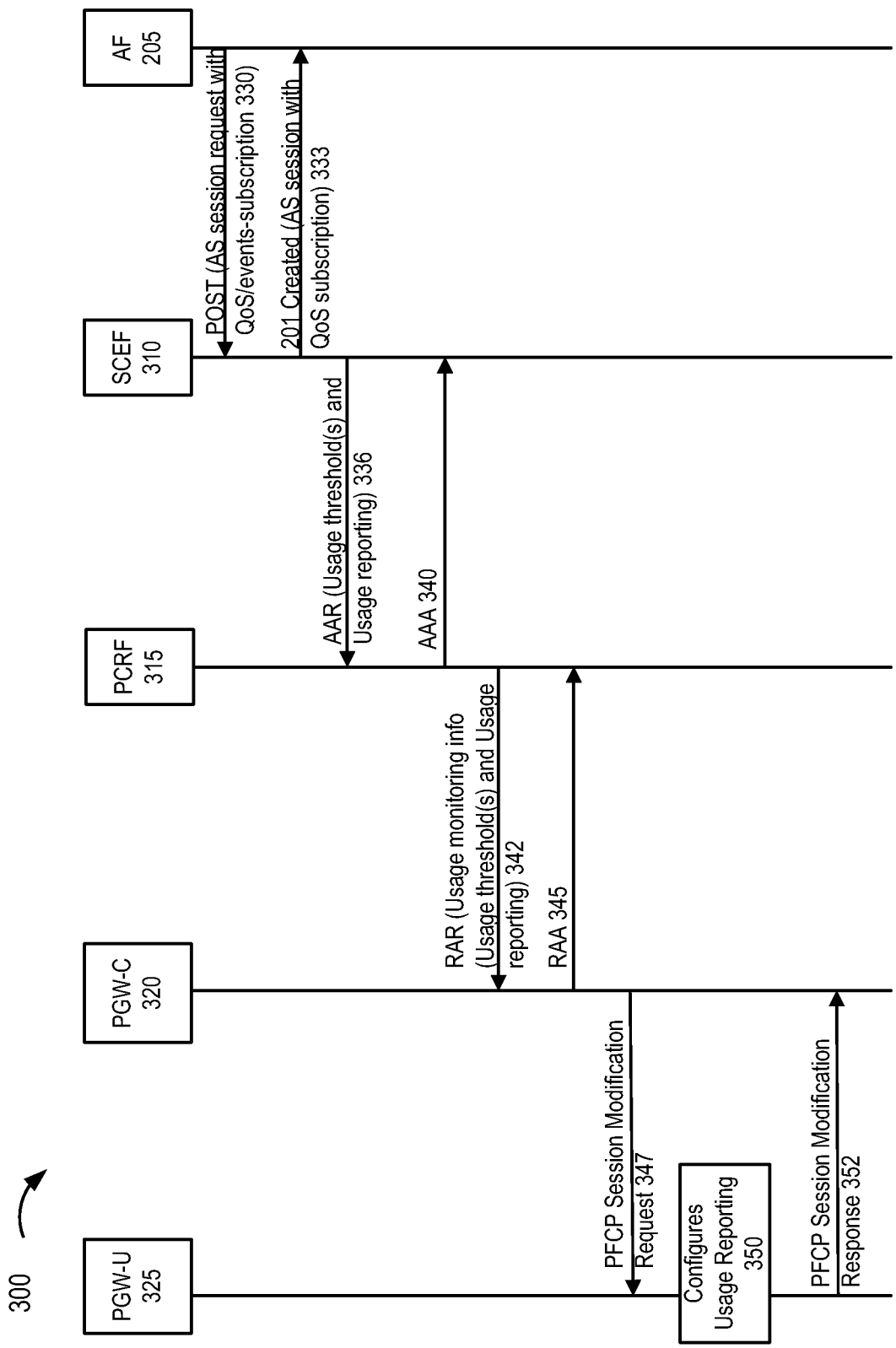
FIGS. 3A and 3B are diagrams illustrating another exemplary process of an exemplary embodiment of the event reporting service.
Figure 3B:
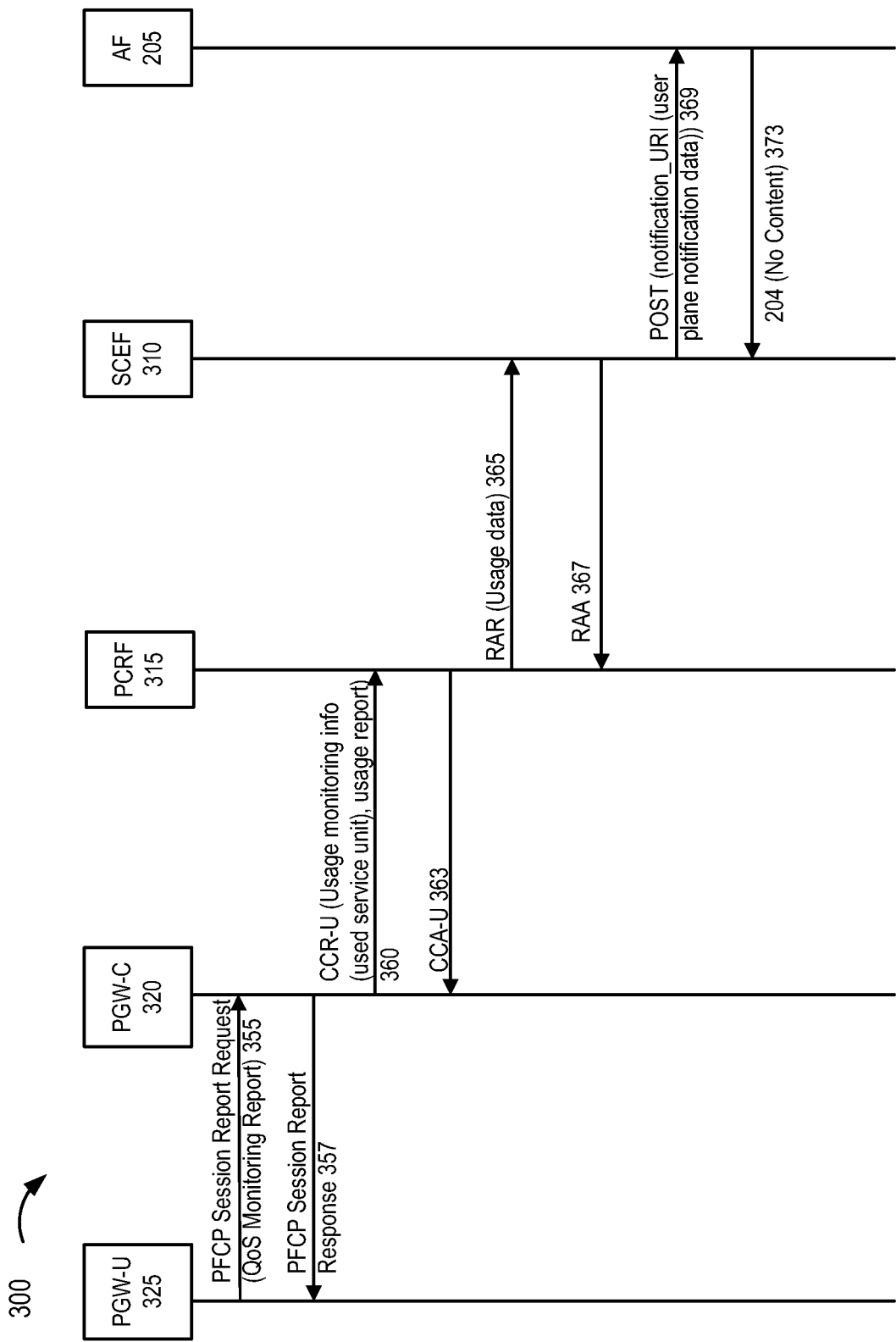

FIGS. 3A and 3B are diagrams illustrating an exemplary process 300 of an exemplary embodiment of the event reporting service according to an exemplary scenario. As illustrated, process 300 may implemented in an environment that includes core devices 122, such as a SCEF 310, a PCRF 315, a PGW-C 320, and a PGW-U 325. As described in relation to FIG. 1, according to other exemplary embodiments, the environment may include other types of core devices 122, not specifically illustrated and described in FIGS. 3A and 3B. As further illustrated, process 300 may be implemented in an environment that includes external device 117, such as AF 205. According to other exemplary embodiments, external device 117 may be implemented as an SCS, an AS, or a similar type of network device that may subscribe to the event reporting service, as described herein.

SCEF 310, PCRF 315, PGW-C 320, and PGW-U 325 may each provide a function and/or a service in accordance with a network standard (e.g., 3GPP, 3GPP2, ITU, ETSI, GSMA, and/or the like) and/or of a proprietary nature. For example, SCEF 310 may provide service capability exposure to securely expose the services and capabilities of network interfaces, among other functions. PCRF 315 may provide policy control decisions and controlling the flow-based charging functionalities in the policy control enforcement function (PCEF). PCRF 315 may provide QoS authorization, service data flow detection, among other functions. PGW-C 320 may provide resource management for bearer resources, bearing binding, subscriber IP address management, and mobility support, among other functions. PGW-U 325 may provide a user data plane ingress and egress point to the EPC, among other functions.

Additionally, for example, SCEF 310, PCRF 315, PGW-C 320, and/or PGW-U 325 may include logic of an exemplary embodiment of an event reporting service, as described herein.

The messages illustrated and described are exemplary. According to an exemplary embodiment, the messages may be implemented to include Authorization-Authentication Request (AAR), Re-Auth-Request (RAR), HTTP, and Credit Control messages. According to other exemplary embodiments, the messages may be implemented using other types of messages. Additionally, process 300 may include additional messages and/or communications between core devices 122 not specifically described and illustrated.

Referring to FIG. 3A, according to an exemplary scenario, AF 205 may transmit a message to create a subscription to a usage event of the event reporting service. The usage event may pertain to an existing AF application session with end device 130 (not illustrated). For example, AF 205 may generate and transmit an HTTP POST message 330 to SCEF 310. HTTP POST message 230 may include an AS session request with QoS information to be monitored. For example, the QoS information may indicate QoS monitoring information, such as uplink (UL) packet delay, downlink (DL) packet delay, and/or roundtrip packet delay. HTTP POST message 330 may include other information, such as an identifier of AF 205, an IP address for end device 130, and/or a flow identifier.

HTTP POST message 330 may include event subscription information. For example, an information element may indicate that the notifications are to be periodic or non-singluar. The information element may indicate a time interval between successive event notifications when the notifications are to be periodic. For example, the time interval may be expressed in seconds, minutes, or another suitable unit of measure of time.

The event subscription information may include other usage event threshold data, such as information elements pertaining to a total volume of data for uplink and downlink, (e.g., total data octets or another type of unit of measure for data volume) an uplink volume, a downlink volume, a duration, and/or another type of usage threshold value in which the QoS is to be applied. In response to receiving HTTP POST message 330, assume SCEF 310 accepts the subscription request and generates and transmits an HTTP 201 Created message 333 to AF 205. HTTP 201 Created message 333 may include the location or URI of the newly created resource.

As further illustrated, SCEF 310 may generate an AAR command message 336 to PCRF 315. AAR command message 336 may include usage event threshold data, such as a threshold value pertaining to volume of data and/or time in the UL and/or DL, as described herein. AAR message 336 may include usage reporting information, which may include event subscription information (e.g., periodic or non-singular usage reporting). AAR command message 336 may include other information, such as an IP address of end device 130 (not illustrated) and/or an AF application identifier, for example. In response to receiving AAR command message 336 and performance of successful performance of session binding, PCRF 315 may generate and transmit an AAA command message 340 to SCEF 310.

Based on AAA command message 340, PCRF 315 may initiate a Policy and Charging Control (PCC) rule provisioning procedure. For example, PCRF 315 may generate and transmit an RAR command message 342 to PGW-C 320 relating to usage monitoring of user plane traffic. RAR command message 342 may include the user event threshold data and the event subscription information. In response to receiving RAR command message 342, PGW-C 320 may generate and transmit a Re-Auth-Answer (RAA) command message 345 to PCRF 315.

Based on the transmission of RAA command message 345, PGW-C 320 may initiate a PFCP Session Modification procedure. For example, PGW-C 320 may generate and transmit a PFCP Session Modification Request 347 to PGW-U 325. For example, PFCP Session Modification Request 347 may include a create or update a URR information element that may be associated with a session and may include triggers and thresholds for usage reporting.

As illustrated, in response to receiving PCFP Session Modification Request 347, PGW-U 325 may configure 350 usage reporting for a session (e.g., PDN session, an Internet Protocol Connectivity Access Network (IP-CAN) session, or another type of session). For example, PGW-U 325 may identify a PFCP session context associated with the session, and may update the parameters of the session context according to the usage reporting/event subscription information, as described herein. PGW-U 325 may generate and transmit a PFCP Session Modification response 352 to PGW-C 320. PFCP Session Modification response 352 may indicate acceptance and/or success that the PDR has been created. PFCP Session Modification response 352 may include information that indicates the information that PGW-U 325 is to provide to PGW-C 320 based on the usage reporting rule/event subscription information (e.g., time and/or volume, periodic or non-singular), the usage event threshold data, and an identifier of the URR.

Referring to FIG. 3B, PGW-U 325 may notify PGW-C 320 when the time and/or volume of thresholds are satisfied based on the URR information. For example, PGW-U 325 may generate and transmit a PFCP Session Report Request 355 to PGW-C 320. PFCP Session Report Request 355 may include the usage report and usage details relating to time and/or volume of data, as described herein. PGW-U 325 may reset its local counter, timer, or similar type of mechanism to enable subsequent usage reporting. PGW-C 320 may receive PFCP Session Report Request 355, and in response, may generate and transmit a PFCP Session Report Response 357, which may indicate the success of the failure of the received message.

PGW-C 320 may generate and transmit a CC request update (CCR-U) command message 360 to PCRF 315. For example, CCR-U command message 360 may include usage monitoring information, such as the data volume-based and/or time-based values. PCRF 315 may generate and transmit a CC answer-update (CCA-U) command message 363 to PGW-C 320. CCA-U command message 363 may indicate acceptance of the CCR-U command message 360.

As further illustrated, PCRF 315 may generate and transmit an RAR command message 365 to SCEF 310. RAR command message 365 may include the usage monitoring information, as described herein. In response to receiving RAR message 365, SCEF 310 may generate and transmit an RAA command message 367, which may acknowledge RAR command message 365, to PCRF 315.

SCEF 310 may generate and transmit an HTTP POST message 369 to AF 205. HTTP POST message 369 may indicate the notification event (e.g., usage threshold reached) and the usage monitoring information. SCEF 310 may transmit HTTP POST message 369 to the event URI (e.g., notification URI) provided by AF 205 during the creation of the AS Session with QOS Subscription, as described in relation to messages 330 and 333 depicted in FIG. 3A. In response to receiving HTTP POST message 369, AF 205 may generate and transmit an HTTP 204 No Content message 373, which may acknowledge receipt of HTTP POST message 369, to SCEF 310. According to other exemplary embodiments and scenarios, process 300 may include additional operations, fewer operations, and/or different operations.

FIG. 4 is a diagram illustrating exemplary components of a device 400 that may be included in one or more of the devices described herein. For example, device 400 may correspond to access device 107, external device 117, core device 122, end device 130, AF 205, NEF 210, PCF 215, SMF 220, UPF 225, SCEF 310, PCRF 315, PGW-C 320, PGW-U 325, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to PCF 215 and PCRF 315, software 420 may include an application that, when executed by processor 410, provides a function and/or a process of event reporting service, as described herein. Additionally, with reference to SMF 220 and PGW-C 320, software 420 may include an application that, when executed by processor 410, provides a function and/or a process of event reporting service, as described herein. With reference to UPF 225 and PGW-U 325, software 420 may include an application that, when executed by processor 410, provides a function and/or a process of event reporting service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
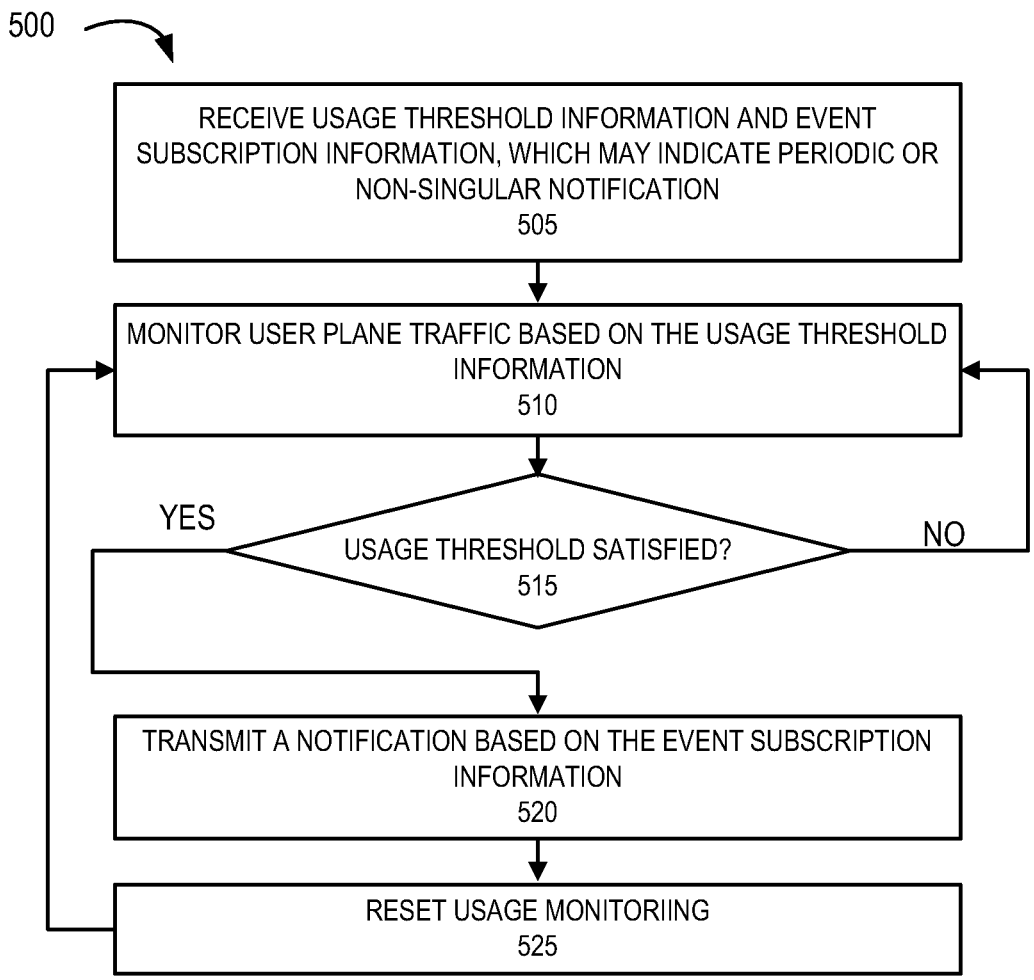
FIG. 5 is a flow diagram illustrating an exemplary process of an exemplary embodiment of the event reporting service.

FIG. 5 is a flow diagram illustrating yet another exemplary process 500 of an exemplary embodiment of the event reporting service. According to an exemplary embodiment, a UPF (e.g., UPF 225) or a PGW-U (e.g., PGW-U 325) may perform a step of process 500. According to an exemplary implementation, processor 410 executes software 420 to perform a step of process 500, as described herein. Alternatively, a step may be performed by execution of only hardware.

In block 505, the UPF or the PGW-U may receive usage threshold information and event subscription information, which may indicate periodic or non-singular notification. For example, the UPF may receive the usage threshold information and the event subscription information from a PCF via an SMF regarding a session and usage monitoring. Alternatively, for example, the PGW-U may receive the usage threshold information and the event subscription information from a PCRF via a PGW-C regarding a session and usage monitoring. As described herein, the usage threshold information may include a threshold value of a data volume-based event, a time-based event, or a combination of time and data volume-based events. As described herein, the event subscription information may indicate a periodic or a non-singular notification relating to the usage threshold information. The UPF or the PGW-U may configure usage monitoring for user plane traffic of a session associated with an AF or another type of subscribing network device and an end device based on the usage threshold information and the event subscription information.

In block 510, the UPF or the PGW-U may monitor user plane traffic based on the usage threshold information. For example, the UPF or the PGW-U may monitor data flow of the session and calculate a usage value.

In block 515, the UPF or the PGW-U may determine whether a usage threshold has been satisfied. For example, the UPF or the PGW-U may compare the calculated usage value to the usage threshold value included in the usage threshold information.

When the UPF or the PGW-U determines that the usage threshold has not been satisfied (block 515-NO), process 500 may return to block 510 and continue to monitor the user plane traffic (block 510). For example, based on a result of the comparison, the UPF or the PGW-U may determine that the calculated usage value does not satisfy the usage threshold value. When the UPF or the PGW-U determines that the usage threshold has been reached (block 515-YES), the UPF or the PGW-U may transmit a notification based on the event subscription information (block 520). For example, based on a result of the comparison, the UPF or the PGW-U may determine that the calculated usage value satisfies the usage threshold. In response, for example, based on the event notification information, the UPF or the PGW-U may generate and transmit a usage report that includes the calculated usage values, as described herein. For example, the UPF may transmit the usage report to PCF via the SMF, and the PGW-U may transmit the usage report to the PCRF via the PGW-C.

In block 525, the UPF or the PGW-U may reset the usage monitoring. For example, the UPF or the PGW-U may reset the monitored usage values associated with the session in response to determining that the usage threshold value has been satisfied. Process 500 may return to block 510 and may continue to monitor the usage plane traffic.

FIG. 5 illustrates an exemplary process of the event reporting service, according to other exemplary embodiments, the event reporting service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the processes illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a network device of a core network from a third party device, a request that includes usage threshold information and event subscription information, wherein the event subscription information indicates a request to subscribe for monitoring an event associated with an end device according to the usage threshold information and a request for providing periodic or non-singular notification;
   monitoring, by the network device, user plane traffic of a session associated with the end device based on the usage threshold information and the event subscription information;
   determining, by the network device, that the usage threshold information has been satisfied; and
   transmitting, by the network device based on the event subscription information, a notification to the third party device that includes a usage value.

2. The method of claim 1, wherein the usage threshold information includes a threshold value pertaining to a data volume, a time period, or the data volume and the time period.

3. The method of claim 1, wherein the monitoring comprises:
   calculating, by the network device, a usage value associated with the user plane traffic.

4. The method of claim 3, further comprising:
   comparing, by the network device, the usage value to the usage threshold information.

5. The method of claim 1, wherein the notification is transmitted via a session management function (SMF).

6. The method of claim 1, wherein the network device receives the usage threshold information and the event subscription information in a session modification request.

7. The method of claim 1, further comprising:
   resetting, by the network device in response to the determining, a usage value associated with the monitoring.

8. The method of claim 1, wherein the network device is a user plane function (UPF) or a packet data network gateway (PGW).

9. A network device comprising:
   a processor that is configured to:
      receive, from a third party device, a request that includes usage threshold information and event subscription information, wherein the event subscription information indicates a request to subscribe for monitoring an event associated with an end device according to the usage threshold information and a request for providing periodic or non-singular notification, and the network device is of a core network;
      monitor user plane traffic of a session associated with the end device based on the usage threshold information and the event subscription information;
      determine that the usage threshold information has been satisfied; and
      transmit based on the event subscription information, a notification to the third party device that includes a usage value.

10. The network device of claim 9, wherein the usage threshold information includes a threshold value pertaining to a data volume, a time period, or the data volume and the time period.

11. The network device of claim 9, wherein the processor is further configured to:
    calculate a usage value associated with the user plane traffic.

12. The network device of claim 11, wherein the processor is further configured to:
    compare the usage value to the usage threshold information.

13. The network device of claim 9, wherein the notification is transmitted via a session management function (SMF).

14. The network device of claim 9, wherein the network device receives the usage threshold information and the event subscription information in a session modification request.

15. The network device of claim 9, wherein the processor is further configured to:
    reset, in response to the determining, a usage value associated with the monitoring.

16. The network device of claim 9, wherein the network device is a user plane function (UPF) or a packet data network gateway (PGW).

17. A non-transitory computer-readable storage medium storing instructions executable by a processor of a network device of a core network, wherein the instructions are configured to:

receive usage threshold information and event subscription information, wherein the event subscription information indicates a request to subscribe for monitoring an event associated with an end device according to the usage threshold information and a request for providing periodic or non-singular notification;

monitor user plane traffic of a session associated with the end device based on the usage threshold information and the event subscription information;

determine that the usage threshold information has been satisfied; and transmit based on the event subscription information, a notification to the third party device that includes a usage value.

18. The non-transitory computer-readable storage medium of claim 17, wherein the usage threshold information includes a threshold value pertaining to a data volume, a time period, or the data volume and the time period.

19. The non-transitory computer-readable storage medium of claim 17, wherein the notification is transmitted to a session management function (SMF).

20. The non-transitory computer-readable storage medium of claim 17, wherein the network device is a user plane function (UPF) or a packet data network gateway (PGW).

* * * * *